April 7, 1964   A. W. MOONEY   3,128,064
AIRCRAFT LANDING GEAR
Filed Sept. 1, 1959
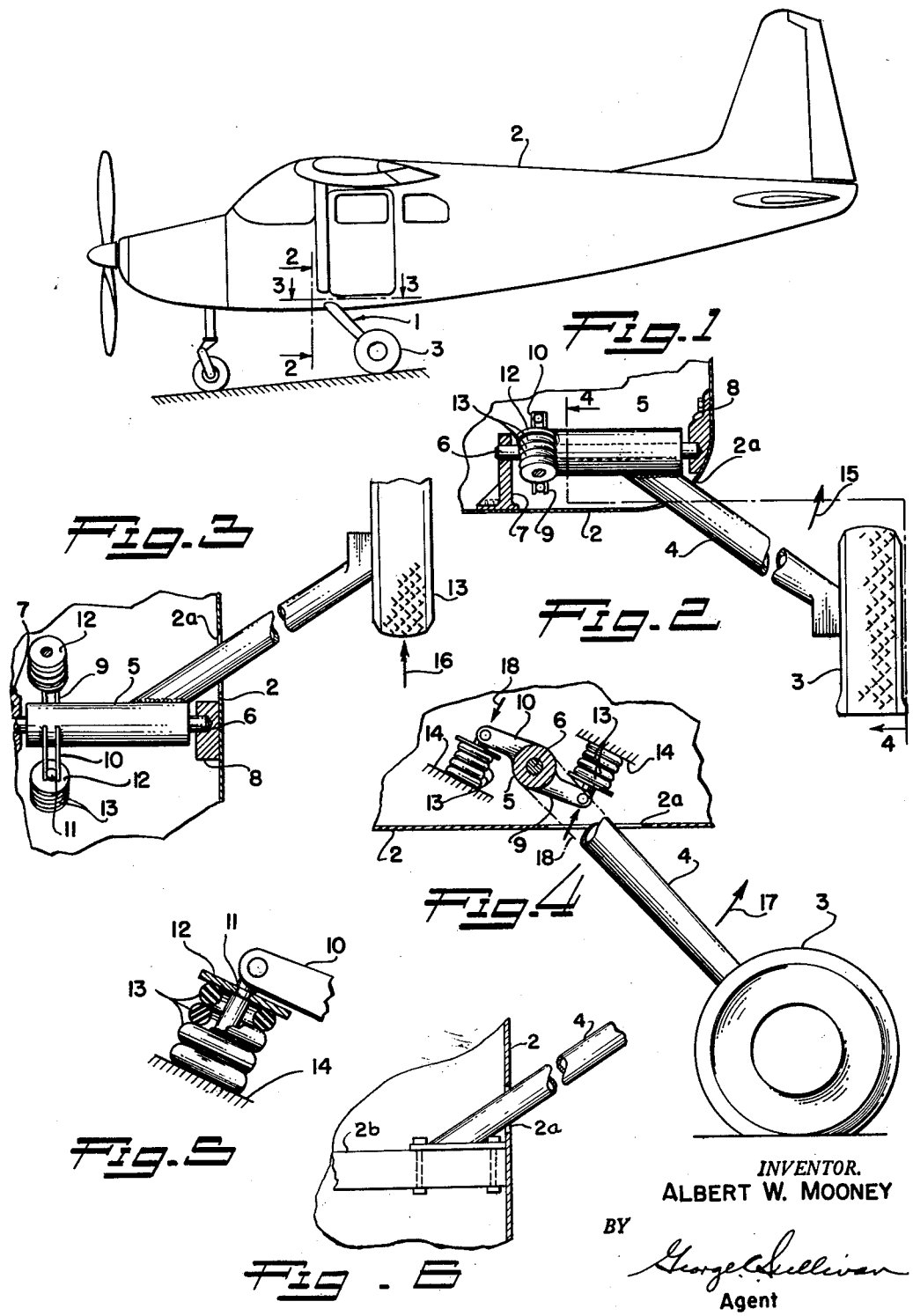
INVENTOR.
ALBERT W. MOONEY
BY
George C. Sullivan
Agent ns and an aircraft 2 and having a ground
United States Patent Office 3,128,064
Patented Apr. 7, 1964

3,128,064
AIRCRAFT LANDING GEAR
Albert W. Mooney, Smyrna, Ga., assignor to Lockheed Aircraft Corporation, Burbank, Calif.
Filed Sept. 1, 1959, Ser. No. 837,422
2 Claims. (Cl. 244—104)

This invention relates to a resilient type aircraft landing gear, and more particularly to an improvement in the shock absorption properties or qualities of an aircraft landing gear of the fixed type resulting in less of the shock being transmitted to the aircraft fuselage.

Prior art arrangements have provided resilient and flexible qualities for deflection of the wheel of the gear relative to the aircraft fuselage in an upward and outboard or transverse direction relative to the fuselage center line. However, such gears have considerably less resiliency in a fore and aft direction to permit deflection of the gear in an aft direction relative to the fuselage, and thereby transmits a substantial portion, if not all, of any aft or longitudinal directed shock to the fuselage structure proper when operating on very rough terrain or unimproved fields or landing areas. This transmittal of the aft or longitudinal directed shock results in severe loads having to be carried by the fuselage structure in the immediate vicinity to which the landing gear is connected and in many cases has resulted in failure of the connection by tearing of the gear from the fuselage.

Accordingly, it is an object of this invention to provide a fixed landing gear for an aircraft having increased inherent resilient properties for substantially absorbing any aft directed shock loads as well as outboard and upward directed loads.

A further object of this invention is to provide a fixed landing gear for an aircraft having improved inherent capabilities of absorbing substantial shock loads in directions aft, upward and/or perpendicular of the fuselage longitudinal axis relying on a complete mechanical shock absorbing means of the simplest nature.

It is still another object of this invention to provide a fixed landing gear which has a minimum of moving parts thus resulting in a minimum of servicing and maintenance thereof.

A further object of this invention is to provide a simple fixed landing gear for an aircraft of low cost of construction and maintenance, while yet providing a most durable landing gear strut capable of satisfactory operation on unimproved surfaces or terrains.

Further objects and advantages of this invention will become apparent from the following description taken in connection with the accompanying drawings in which:

FIGURE 1 is an elevational view of an aircraft having a landing gear of this invention;

FIGURE 2 is a view taken along line 2—2 of FIGURE 1;

FIGURE 3 is a view taken along line 3—3 of FIGURE 1;

FIGURE 4 is a view taken along line 4—4 of FIGURE 2;

FIGURE 5 is a partial cross-sectional enlarged view of a mechanical shock absorption means employed in the landing gear of this invention; and, FIGURE 6 is a view similar to FIGURE 3 showing another embodiment of the present invention without incorporation of a mechanical shock absorption means.

Generally stated, the invention is practiced by a tubular landing gear member extending from an aircraft fuselage in a downward, lateral and aft direction relative to the longitudinal center line of the fuselage. In this manner, operation of the aircraft over a rough or unimproved terrain, or the transmittal to the gear of deflections caused by a rut or rock on an unimproved field will permit deflection of the gear in an upward, aftward and outward direction relative to the fuselage without transmittal of the entire shock of such deflection to the fuselage structure proper as a substantial amount of such shock loads are absorbed by the inherent spring qualities of the tubular strut in all directions.

Referring more particularly to the drawings, the preferred embodiment of this invention shown in FIGURES 1 through 4 has a main landing gear 1 depending from the fuslage of an aircraft 2 and having a ground engaging member 3 thereon. The gear 1 comprises a tapered tubular member 4 of constant strength to which the ground engaging member or tire 3 is mounted to one end for rotation therearound. The other end of tubular member 4 is fixedly secured, such as by welding, to a cylindrical member 5 that is rotatively mounted on an axle 6. Axle 6 is fixedly secured or mounted to fuselage 2 through members 7 and 8 and is aligned so that the axis of axle 6 is at right angles or normal to the longitudinal axis of the fuselage 2. The securing or attaching of the tubular and cylindrical members 4 and 5 respectively is such that there is an angulation of tubular member 4 relative to the longitudinal centerline of fuselage 2, when cylinder 5 is mounted in the aircraft as hereinbefore stated, such that tubular member 4 extends downwardly and outwardly from fuselage 2 through an opening 2a as can best be seen in FIGURE 2, and downwardly and rearwardly as can best be seen in FIGURES 3 and 4.

In order to prevent transfer or transmittal to the fuselage structure of some of the loads of the rotation of cylindrical member 5 around axle 6 there are provided a pair of lever arm members 9 and 10 extending substantially radially from cylindrical member 5 diametrically opposite each other. At each outer end of lever arms 9 and 10 is pivotally fastened a load absorbing and damping arrangement comprising a shaft or rod like member 11 having a radial extending shoulder or flange 12 of an outer diameter substantially larger than the diameter of rod 11. A plurality of annular doughnut like elastomeric members 13 are located between shoulder 12 or rod 11 and a structure member 14 which forms a portion of the structure of fuselage 2.

While I have described the landing gear of this invention depending or extending from one side of the fuselage only, it is to be realized that the gear extending from the other side of the fuselage is of the same and identical construction. Likewise, it is to be pointed out that, while I have shown a shock absorbing means associated with cylinder 5 within the aircraft, the invention can be practiced to a less efficient degree by fixedly securing tubular member 5 to the structure of fuselage 2, or through any appropriate fixed mounting arrangement such as shown in FIGURE 6, in which case the shock loads not absorbed by strut 4 will be transmitted to the structure 2b of fuselage 2, but which will be of a lesser degree with the gear extending downward, aftward and outward than if the gear extended downward and outward only.

In operation, as the gear assumes the support of the weight of fuselage 2, the wheel 3 will deflect in an outward, upward and aft direction relative to fuselage 2 as indicated by arrows 15, 16 and 17 in FIGURES 2, 3 and 4 respectively. The aftward and upward rotation of wheel 3 as indicated by arrow 17 in FIGURE 4 causes tubular member 4 to rotate cylindrical member 5 around axle 6 so that lever arms 9 and 10 rotate in a clockwise direction as viewed and indicated by arrow 18 in FIGURE 4. Such rotation of lever arms 9 and 10 causes shoulder 12 of rod 11 to move towards the fixed structure 14 thereby deforming the elastomeric members 13 located between shoulders 12 and structures 14 thereby assuming substantially the balance of the loads. Once the entire weight of the aircraft is settled on and supported by the landing gear, should one of the wheels 3 encounter a substantial size rut, mound or rock in or on the ground, the shock load of such is transmitted to tubular member 4 forcing the outer end of tubular 4 in a further outward, upward and aft direction relative to fuselage 2. The momentum of fuselage 2 and the encountering of such an obstruction by wheel 3 in a gear of the prior art type would ordinarily result in a severe shock to the fuselage structure at the point of connection of tubular strut member 4 to the fuselage, but with this invention, such shock can be absorbed by the aft directed angulation of strut member 4 to the center line of fuselage 2 to a substantially greater degree than if the center line of tubular strut 4 was located perpendicular or normal to the center line of fuselage 2.

Thus it can be seen that this invention provides a much safer type landing gear for operation of a small business or personal type aircraft over rough and unimproved terrain while providing a most simple and uncomplicated gear of very few parts requiring only the most simple and uncomplicated service or maintenance.

While a particular embodiment of the invention has been illustrated and described, it will be obvious to those skilled in the art that various changes and modifications may be made without departure from the invention and it is intended to cover in the appended claims all such modifications and embodiments as fall within the true spirit and scope of this invention.

What is claimed is:

1. An aircraft including a body member, a flexural resilient tubular strut member having substantially equal flexural resiliency in any direction normal to the strut axis depending from the body with a ground engaging member on one end, a cylindrical member fixedly secured to the other end of said strut, said cylindrical member pivotally mounted on an axle mounted in the body the axis of which is horizontal and normal to the longitudinal centerline of the body, shock absorbing means located within the body, and means extending from the cylindrical member and connected to the shock absorbing means, said strut depending from the body in a direction having downward, lateral and aft components whereupon shock loads from the ground engaging member are absorbed by the flexural resiliency of the strut member and the shock absorbing means as the absorbing of the shock loads occurs by deflection of the ground engaging member in any combination of upward, aftward and outward directions relative to the body member.

2. In combination with an aircraft fuselage, a flexural resilient landing gear strut member extending from each side of the fuselage and having substantially equal flexural resiliency in any direction normal to the strut axis, each of said strut members fixedly secured to the fuselage and depending therefrom in a direction having downward, lateral and aft components when the aircraft is in its static condition, and a ground engaging member connected to the free end of each strut, said ground engaging member deflecting in an outward, upward and aft direction relative to the fuselage as each strut assumes support of the fuselage weight as a result of the flexural resiliency of the strut members and the depending directions of the strut members from the fuselage.

References Cited in the file of this patent

UNITED STATES PATENTS

| 2,092,644 | Erny | Sept. 7, 1937 |
| 2,692,098 | Schmued et al. | Oct. 19, 1954 |
| 2,933,270 | Maltby | Apr. 9, 1960 |
| 2,973,168 | Hartel | Feb. 28, 1961 |

FOREIGN PATENTS

| 829,039 | France | Mar. 7, 1938 |

OTHER REFERENCES

Flight Magazine, August 18, 1949, page 205.